United States Patent [19]

Nakatani et al.

[11] Patent Number: 4,524,315

[45] Date of Patent: Jun. 18, 1985

[54] ROLL FILM CARRIER USED IN READER OR READER PRINTER

[75] Inventors: Keiji Nakatani, Kanagawa; Seiichi Yamagishi, Tokyo; Kenjiro Ishii, Kanagawa, all of Japan

[73] Assignee: Minolta Camera Kabushiki Kaisha, Osaka, Japan

[21] Appl. No.: 369,867

[22] Filed: Apr. 19, 1982

[30] Foreign Application Priority Data

Apr. 24, 1981 [JP] Japan ................................. 56-63102

[51] Int. Cl.³ ............................................. G05B 19/28
[52] U.S. Cl. ...................................... 318/603; 318/6; 318/601; 360/71
[58] Field of Search ....................... 318/603, 7, 6, 601; 360/71, 72.1, 72.2, 72.3

[56] References Cited

U.S. PATENT DOCUMENTS

| | | | |
|---|---|---|---|
| 3,997,828 | 12/1976 | Bottcher | 318/603 |
| 4,047,085 | 9/1977 | Ollendick | 318/603 |
| 4,068,934 | 1/1978 | Tanaka et al. | 358/26 |
| 4,160,195 | 7/1979 | Sakamoto | 318/7 |
| 4,166,239 | 8/1979 | Nakatani | 318/266 |
| 4,213,583 | 7/1980 | Mitani et al. | 318/6 |
| 4,295,171 | 10/1981 | Hirota et al. | 318/603 |
| 4,347,538 | 8/1982 | Klank | 360/72.3 |
| 4,377,826 | 3/1983 | Furuta | 360/72.1 |

FOREIGN PATENT DOCUMENTS 46-43186 12/1971 Japan ................................. 103/1 D

*Primary Examiner*—B. Dobeck
*Attorney, Agent, or Firm*—Wolder Gross & Yavner

[57] ABSTRACT

In a roll film carrier for rewinding the roll film wound on a supply reel onto a take-up reel there are provided a signal generating means which detects the rotation of the supply reel shaft and outputs a corresponding signal, a means for generating a pulse synchronously with the passage of the roll film and a means for controlling the driving of the roll film through comparison of the number of pulses generated in the signal generating period of the signal generating means with a predetermined number and it is so arranged that the driving of the roll film is stopped when the number of generated pulses has agreed with the predetermined number.

12 Claims, 4 Drawing Figures

4,524,315

ROLL FILM CARRIER USED IN READER OR READER PRINTER

BACKGROUND OF THE INVENTION

1. Field of the Invention

The present invention relates to a roll film carrier applicable to a reader or a reader printer. More particularly, it relates to a roll film carrier capable of stopping a roll film by detecting its trailing end or a mid-way retrieval position.

2. Description of the Prior Art

As disclosed in U.S. Pat. No. 4,166,239, it is taken as one of the most important control functions to detect the trailing end of a roll film or a mid-way desired retrieval position to stop film feeding thereby when operation such as winding and rewinding of the roll film is to be controlled in a reader or reader printer using roll film.

driving device such as a motor, regardless of whether each frame of the roll film is retrieved automatically or visually, it is possible that the roll film is wound up to the trailing end due to inadvertence of or mis-manipulation by the user. Especially when the other end of the roll film is fixed to the reel shaft, such excessive winding possibly causes troubles such as breakage of roll film, damage to its drive system and overheating of the motor.

In order to prevent the aforesaid defects, there is proposed in the U.S. Pat. No. 4,068,934 a method in which a special mark such as end mark is put in the vicinity of the trailing end of roll film so that, when the mark is detected by a mark detecting means, a stop signal is transmitted to the roll film driving device. According to Jap. Pat. Appl. Publication No. Sho-46-43186, on the other hand, a detection means is used to detect the mark for counting put in each frame of roll film. Proposed therein is a method by the use of a mark detection means to determine the time interval between two adjacent marks detected and a timer means with a predetermined time interval set thereon wherein when said next mark is not detected within said predetermined time interval, it is judged that there is no more frame and the roll film driving device is thereupon stopped. In the abovementioned system it is also possible to stop driving of the roll film also at any mid-way retrieval position by proper selection of the time interval set on the timer means.

In any of these control systems, however, it is necessary to put some mark to the roll film and also provide a mark detecting means and this means an increased cost of the roll film as well as the roll film carrier. This, at the same time, means another drawback of requiring a control device, whose control circuit may possibly be highly complicated.

The method disclosed in U.S. Pat. No. 4,068,934 has a drawback of being inconvenient practically in that, when frames are to be cut off from or added to a roll film, the mark for detecting the trailing end has to be shifted each time accordingly.

In the system disclosed in Jap. Pat. Appl. Publication No. Sho-46-43186, on the other hand, it is required to vary the time interval set on the timer means according to variation of the roll film's feeding speed or alternatively set said time interval to match the lowest film feeding speed with an increased wasteful length of film from the trailing end thereof.

SUMMARY OF THE INVENTION

It is an object of the present invention to provide a roll film carrier free of the defects of the abovementioned conventional devices, being applicable to a reader or reader printer.

Another object of the present invention is to provide a device capable of detecting the trailing end or a desired mid-way retrieval position of the roll film with no special mark put thereon and stopping the roll film securely at the detected position.

According to the present invention, the roll film carrier which rewinds on its rotary driven take-up reel the roll film wound on the supply reel is provided with a means for detecting the rotation of the supply reel shaft and generating signals during the time for said shaft to make the required number of rotations or make the required angle of rotation, a means for generating pulses synchronized with the passage of the roll film by a predetermined length and corresponding to such length and a control means which counts the number of pulses generated during generation of said signal and controls the drive means for the roll film through comparison of this count with the predetermined number.

Thus, it is no longer necessary to put on the roll film any special mark for controlling the stop position, and the drive of the roll film can be securely stopped at its trailing end position or at any desired midway retrieval position after detection thereof.

With the absence of marking ensured is free possibility of cutting off or adding portions or frames of the roll film.

DESCRIPTION OF THE PREFERRED EMBODIMENTS

Figure 1:
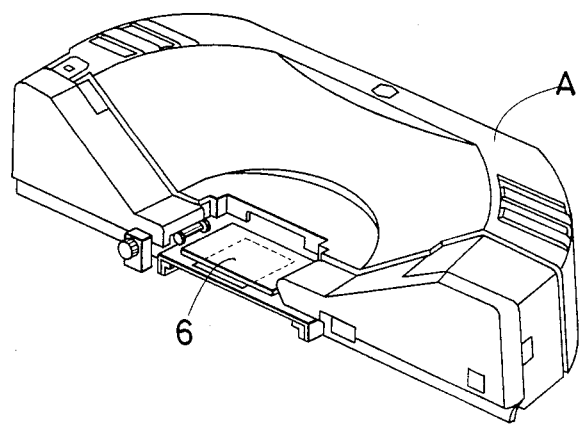
FIG. 1 is a perspective view showing the external appearance of the roll film carrier.

A roll film carrier A applicable to a reader or reader printer has, for instance, an external appearance as shown in FIG. 1, provided with light transmitting plates 6 for guiding a roll film to the optics of a reader or reader printer to be exposed thereby.

Figure 2:
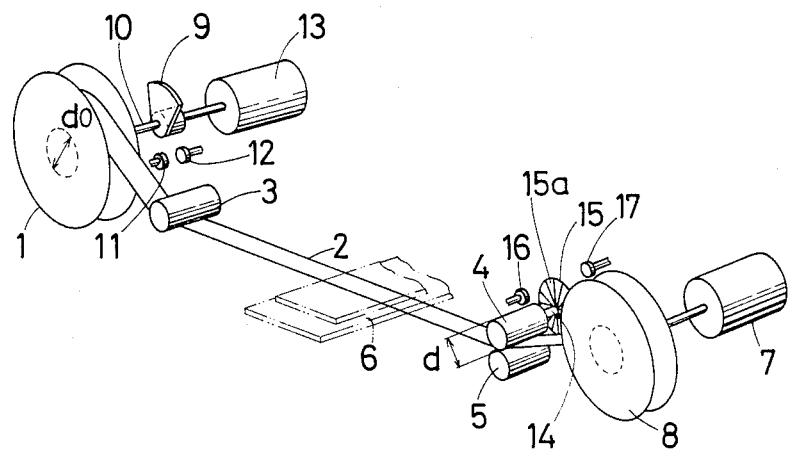
FIG. 2 is another perspective view showing an example of the roll film driving mechanism.

Referring now to FIG. 2, the roll film 2 wound on a drum of a supply reel 1 is unwound and led through between the light transmitting plates 6 by a holding roller 3 and a pair of idle rollers 4 and 5 and wound by a take-up reel 8 driven by motor 7 for winding.

A shaft 10 of the supply reel 1 has fixedly mounted on it a sector-shaped gate plate 9 and across this gate plate 9 a light emitting element 11 and photo detecting element 12 are disposed opposite to each other.

When the supply reel 1 makes one rotation as the take-up reel 8 is driven and with that the sector-shaped gate plate 9 also makes one rotation, signal output is generated by the photo detecting element 12 during the time the light from the light emitting element 11 is received by the photo detecting element 12 uninterrupted by the gate plate 9.

The supply reel shaft 10 has mounted on it a a rewinding motor 13 which operates to rewind the roll film 2.

The shaft of either idle roller 4 or 5, for instance, the shaft 14 of the idle roller 4 has fixedly mounted on it a disc 15 which rotates as the film passes and has in it light transmitting parts 15a arranged equidistant along its periphery for generating a predetermined number of pulses as a given length of the roll film 2 passes. Across the light transmitting part 15a of the disc 15 are disposed opposing to each other another pair of light transmitting element 16 and photo detecting element 17.

As the roll film 2 is driven as aforesaid and with it the disc 15 turns together with the idle roller 4, there are generated by the light emitting element 16 and photo detecting element 17 the number of pulse signals determined by the number of the light transmitting parts 15a of the disc 15 at a terminal of the photo detecting means 17 as the disc 15 makes one rotation.

In the above setup, while the length of the roll film 2 which moves as the supply reel shaft 10 makes one rotation depends on the laps of the roll film 2 wound on the supply reel 1, the number of rotations of the idle roller 4 driven by the passing roll film 2 is always constant for a given passing length of the roll film 2. Hence, by computing the number of rotations the idle roller 4 per rotation of the supply reel shaft 10, it is possible to know the accurate number of the remaining laps of film 2 on the supply reel 1.

Then, the following relationship is determined.

The lap length (ln) of the "n"-th lap of the film 2 wound on the supply reel (reel drum diameter $d_0$) is with the thickness of the film 2 as t, $$ln = \{d_0 + (2_{n-1})t\}\pi$$

With the diameter of the idle roller 4 as (d) and the number of pulses (count) output by the photo detecting element (17) per rotation of the disc 15 as (Pn), the length of film 2 which passes per pulse (lp) is $$lp = \pi d/Pn,$$

hence the count of pulses output by the photo detecting element 17 per lap length (ln) of film 2 in the "n"-th lap on the supply reel 1 (count Cn') is represented by $$Cn' = ln/lp = \{d_0 + (2_{n-1})t\}Pn/d$$

Hence, if the reel drum diameter ($d_0$), the thickness of film 2 (t), the count (number of pulses = Pn) per rotation of the disc 15 and the roller diameter (d) of the idle roller 4 are all constant, the number of laps (n) of film on the supply reel 1 can be determined linearly by detecting the count (Cn').

For instance, when with $$Cn^1 = (d_0 + t)Pn/d$$

Cn' = $Cn^1$ is detected, this corresponds to the n = 1 lap of film, that is, the trailing end of the film 2 wound on the supply reel (1).

Figure 3:
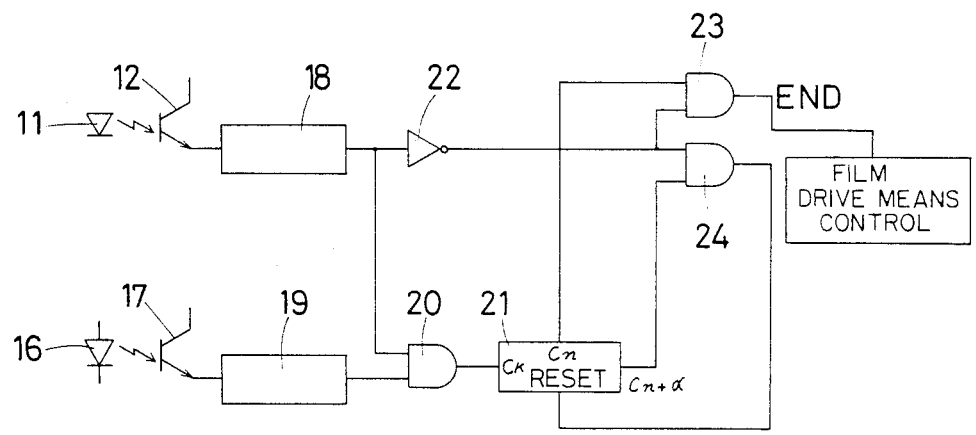
FIG. 3 is a connection diagram showing an example of the drive control circuit.

The mode of controlling the driving of the roll film 2 is as illustrated, for instance, in FIG. 3.

In the FIGS. 18 and 19 are wave-form shaping circuits which are connected with the photo detecting elements 12 and 17 receiving light from the light emitting elements 11 and 16 respectively over the gate plate 9 and the disc 15, and receive the output signals therefrom as input signals and output the high-level signals when the photo detecting elements 12 and 17 have received the light input.

The wave-form output circuits 18 and 19 have connected to it an AND circuit 20 on the output side, which inputs a pulse to the Ck terminal of a counter circuit 21 when, with the signal output from the wave-form shaping circuit 18 "high", the output from the other wave-form shaping circuit 19 has changed from "low" to "high".

The wave-form shaping circuit 18 has also connected to it on the output side an inverter 22, which inverts the output from the wave-form shaping circuit 18 and inputs it to AND circuits 23 and 24.

To the AND circuits 23 and 24 are input, besides the output from the inverter 22, the outputs from a Cn terminal and a Cn+α terminal of the counter circuit 21 respectively. From the Cn terminal is output a signal when the count (=pulse count) is Cn, while from Cn+α is output a signal when the count is higher than Cn.

The output terminal of the AND circuit 24 is connected to a "reset" terminal of the counter circuit 21, and the output terminal of the AND circuit 23 outputs an END signal when the number of pulses counted in the period determined by the gate plate 9 has agreed the preset count Cn and stops the roll film 2.

Figure 4:
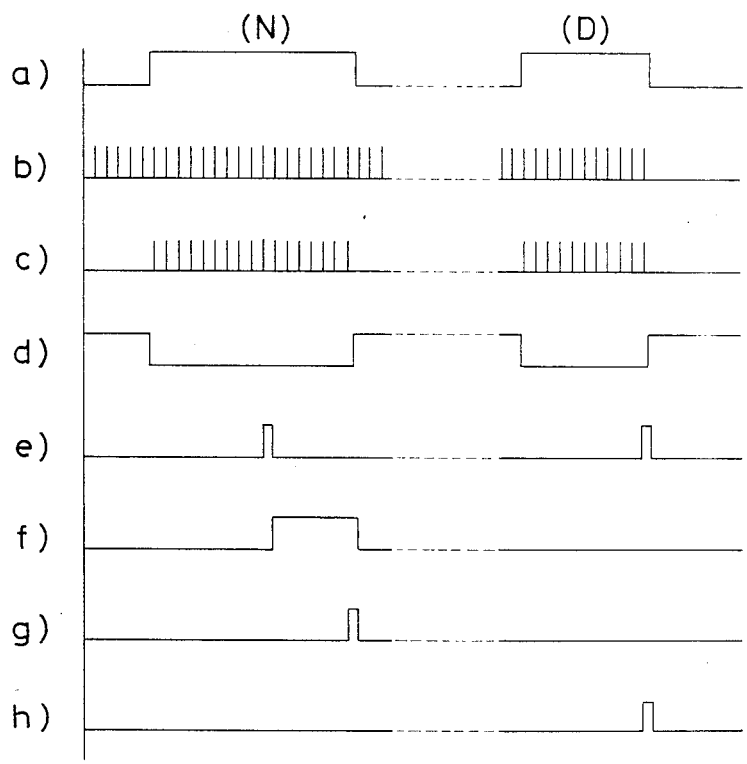
FIG. 4 is an illustrative chart showing the mode of operation of the circuit of FIG. 3.

In FIG. 4 the wave form (a) is of the output signal of the wave-form shaping circuit 18 and it is "high" when the photo detecting element 12 is receiving the light input. The wave form (b) is of the output signal of the wave-form shaping circuit 19 and shows the pulse signals output by the photo detector element 17 as the disc 15 rotates. The wave form (c) is of the signal input to the Ck terminal of the counter circuit 21, and shows that the pulse signal of (b) is input only when (a) is "high". (d) shows the output signal from the inverter 22, which inverts the output from the wave-form shaping circuit 18. (e) and (f) show the output signals from the Cn terminal and the Cn+α terminal respectively. (g) show the signal input to the "reset" terminal of the counter circuit 21 and, as shown, the counter circuit 21 is reset only when the signal (f) is "high" with the light input to the photo detecting element 12 intercepted. (h) shows the END signal output from the AND circuit 23.

In FIG. 4 the (N) section on the lefthand side indicates the signal wave-form when the film 2 is in normal running condition, while the (D) section on the righthand side indicates the wave-form when the trailing end (or the desired retrieval position) is detected.

In the state (N) the END signal is not output as the output signal of the Cn terminal is ON during the predetermined period, while the output signal of the Cn+α terminal is ON upon the lapse of the predetermined peoriod, hence the counter circuit 21 is reset.

In the the state (D) the END signal is output to stop the driving of the roll film for the output signal of the Cn terminal is ON upon the lapse of the predetermined period.

As is apparent from the illustratory charts of FIG. 4, the driving of the roll film can be accurately controlled without doing any special marking on the roll film or doing time-setting by arranging so that the number of pulses from the photo detecting element 17 which cooperates with the disc 15 on the idle roller 4 side to generate pulses is counted as the photo detecting element 12 cooperating with the sector-shaped gate plate 9 receives the light input, the count is compared with the preset count Cn and the counter circuit 21 is reset if it is higher and the signal indicating the trailing end of the roll film 2 is output when said count has agreed with the preset count Cn.

By properly selecting said preset count Cn by correlating it with the number of the laps of film n at the position (frame) to be retrieved with the aid of the abovementioned formula, the desired frame amid the roll film 2 can be retrieved (not only when the number of laps n is an integer but also when it is a mixed number indicating a position corresponding to the number of laps with a fraction of a lap).

While in the above embodiment is shown a case of controlling driving of film by controlling the time of stopping, the present invention is applicable also to the mode of control by gradually decreasing the speed of the drive motor as the trailing end of the roll film is approached.

Further, although described above is a case in which the signal corresponding to the predetermined rotation of the supply reel is generated when the photo detecting element 12 is receiving the light input, it is needless to say that said signal is output also when the photo detecting element 12 is not receiving the light input, such case thus also covered by the present invention.

What is claimed is:

1. A roll film carrier applicable to a reader or a reader printer, including:
   supply reel means for supplying a roll film;
   take-up reel means for winding up said roll film drawn from said supply reel means;
   means for driving said take-up reel means so as to transport said roll film from said supply reel means to said take-up reel means;
   means for generating signals corresponding to a predetermined rotation of said supply reel means;
   means for generating pulses synchronously with substantially equal increments of said transport movement of said roll film along the length thereof; and
   means for counting the number of pulses generated while said signal is being generated and controlling said drive means through comparison of the number of pulses counted with a predetermined number.

2. A roll film carrier as recited in claim 1, wherein said control means generates at least a signal to stop said drive means.

3. A roll film carrier as recited in claim 2, wherein said predetermined number corresponds to the number of pulses indicating the trailing end of said roll film.

4. A roll film carrier applicable to a reader or a reader printer, including:
   supply reel means including a shaft for supplying a roll film;
   take-up reel means for winding up said roll film drawn from said supply reel means;
   means for driving said take-up means so as to transport said roll film from said supply means to said take-up means;
   means for detecting rotation of said shaft of said supply reel means and generating a signal in the period required for said supply reel shaft to rotate a predetermined number of turns or a predetermined angle;
   means for generating a pulse synchronously with the passage of a predetermined length of said roll film and disposed between said supply reel means and said take-up means; and
   control means for counting the number of pulses generated while said signal is being generated, comparing the number of pulses counted with a predetermined number and outputting a signal for controlling said drive means when both said numbers agree.

5. A roll film carrier as recited in claim 4, wherein said control means generates at least a signal to stop said drive means.

6. A roll film carrier as recited in claim 5, wherein said predetermined number corresponds to the number of pulses indicating the trailing end of said roll film.

7. A roll film carrier as recited in claim 4, 5 and 6, wherein said signal generating means includes a light intercepting plate attached to said supply roll shaft and a photo detecting element and a light emitting element disposed as an opposing pair between which said light intercepting plate passes as said supply reel shaft rotates, and said signal is generated while said photo detecting element is receiving the light from said light emitting element or while the light from said light emitting element is intercepted by said light intercepting plate, not reaching said photo detecting means.

8. A roll film carrier as recited in claims 4, 5 and 6, wherein said pulse generating means includes idle roller means which rotate synchronously with passage of said roll film, and said pulse is generated through detection of the rotation of said idle roller means.

9. A roll film carrier as recited in claim 8, wherein said pulse generating means also includes a disc mounted on the shaft of said idle roller means, which mounted in it a plurality of light transmitting parts arranged equidistant peripherally, and an opposing pair of a lightemitting element and a photo detecting element across said disc.

10. A roll film carrier as recited in claim 9, wherein said control means compares the number of pulses generated by said pulse generating means with a predetermined number and generates a signal to stop said drive means when both said numbers have agreed.

11. A mechanism for controlling the advance of a band such as a tape or film from a rotatable reel along a predetermined path comprising:
    first means for measuring the angle of rotation of said reel;
    second means for measuring the length of advance of said band along said path during predetermined angular rotations of said reel; and
    third means for controlling the advance of said band in response to said first and second means in accordance with a predetermined relationship of the measurements thereof.

12. The mechanism of claim 11 wherein said first means determines a predetermined angle of rotation of said reel and said second means generates pulses in response to increments of advance of said band and said third means controls the advance of said band in response to number of said pulses generated during said predetermined angle of rotation being a predetermined number.

* * * * *